(12) United States Patent
Griffith et al.

(10) Patent No.: US 6,475,618 B1
(45) Date of Patent: Nov. 5, 2002

(54) COMPOSITIONS FOR ENHANCED THERMAL BONDING

(75) Inventors: Nina Cecilia Griffith, Atlanta; Xin Ning, Alpharetta; Bryon P. Day, Canton; Maya Aroch, Atlanta, all of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/814,032

(22) Filed: Mar. 21, 2001

(51) Int. Cl.[7] .................................................. D01F 8/00
(52) U.S. Cl. ........................ 428/373; 428/374; 525/444
(58) Field of Search ................................ 428/374, 370, 428/373; 525/444

(56) References Cited

U.S. PATENT DOCUMENTS

| | | |
|---|---|---|
| 3,338,992 A | 8/1967 | Kinney |
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 4,031,165 A | 6/1977 | Saiki et al. |
| 4,115,989 A | 9/1978 | Spolnicki |
| 4,189,549 A | 2/1980 | Matsunaga et al. |
| 4,340,563 A | 7/1982 | Appel et al. |
| 4,408,022 A | 10/1983 | Cincotta et al. |
| 4,451,611 A | 5/1984 | Cincotta et al. |
| 4,489,190 A | 12/1984 | Froix |
| 4,734,240 A | 3/1988 | Chung et al. |
| 4,908,052 A | 3/1990 | Largman et al. |
| 5,069,970 A | 12/1991 | Largman et al. |
| 5,252,397 A | 10/1993 | Hanzawa et al. |
| 5,348,699 A * | 9/1994 | Meyer ........................ 525/444 |
| 5,541,240 A | 7/1996 | Makhija et al. |
| 5,554,442 A | 9/1996 | Matsunaga et al. |
| 5,593,778 A | 1/1997 | Kondo et al. |
| 5,594,076 A | 1/1997 | Gordon, III et al. |
| 5,607,766 A | 3/1997 | Berger |
| 5,652,057 A | 7/1997 | Delker |
| 5,688,582 A | 11/1997 | Nagaoka et al. |
| 5,714,258 A | 2/1998 | Simons |
| 5,760,119 A | 6/1998 | Rafler et al. |
| 5,882,780 A | 3/1999 | Yamamura et al. |
| 5,908,887 A | 6/1999 | Tondre et al. |
| 5,945,216 A | 8/1999 | Flint et al. |
| 5,976,694 A | 11/1999 | Tsai et al. |
| 5,994,451 A | 11/1999 | Dangayach |
| 6,231,976 B1 * | 5/2001 | Dean et al. ................. 428/373 |

FOREIGN PATENT DOCUMENTS

| | | |
|---|---|---|
| EP | 007 802 | 2/1980 |
| EP | 154 065 | 9/1985 |
| EP | 303 449 | 5/1999 |
| JP | 3-033218 | 2/1991 |
| JP | 4-222824 | 8/1992 |
| JP | 5-093315 | 4/1993 |
| JP | 7-289629 | 11/1995 |
| JP | 9-143255 | 6/1997 |
| JP | 9-309946 | 12/1997 |
| JP | 9-324323 | 12/1997 |
| JP | 9-328554 | 12/1997 |
| JP | 10-017657 | 1/1998 |
| JP | 10-237179 | 9/1998 |
| JP | 10-325017 | 12/1998 |
| JP | 10-325019 | 12/1998 |
| JP | 10-325020 | 12/1998 |
| JP | 11-279268 | 10/1999 |
| JP | 11-323107 | 11/1999 |
| WO | 98/51396 | 11/1998 |
| WO | 99/23187 | 5/1999 |

OTHER PUBLICATIONS

Dictionary of Fiber and Textile Technology p. 32, 1989.*

* cited by examiner

*Primary Examiner*—Newton Edwards
(74) *Attorney, Agent, or Firm*—Pauley Petersen Kinne & Erickson

(57) ABSTRACT

A composition including an aromatic polyester and a copolyester having a lower melting point than the aromatic polyester. The aromatic polyester and the copolyester can be blended together to form fibers and fibrous webs. The composition can be thermally bonded at a temperature below the melting point of the aromatic polyester.

1 Claim, No Drawings

COMPOSITIONS FOR ENHANCED THERMAL BONDING

FIELD OF THE INVENTION

This invention is directed to compositions that can be thermally bonded at relatively low temperatures.

BACKGROUND OF THE INVENTION

Aromatic polyesters, such as polyethylene terephthalate (PET), polytrimethylene terephthalate (PTT), and polybutylene terephthalate (PBT), are widely used in fiber forming applications. However, the use of aromatic polyesters in nonwoven applications has been hindered by the inability of aromatic polyesters to be thermally bonded at relatively moderate bonding temperatures, such as those used for polypropylene, because polyesters have relatively high melting points.

Aliphatic copolyesters, which may or may not have an aromatic structure, typically have much lower melting points than aromatic polyesters. The melting points of aliphatic copolyesters are in about the same range as those of polyolefins. Similarly, aromatic copolyesters also melt at lower temperatures than typical aromatic polyesters. However, aliphatic copolyesters and aromatic copolyesters typically have less desirable fiber forming properties than aromatic polyesters.

There is a need or desire for compositions having favorable fiber forming properties as well as the ability to be thermally bonded at relatively moderate bonding temperatures.

SUMMARY OF THE INVENTION

The present invention is directed to fiber forming compositions made from aliphatic copolyesters blended with aromatic polyesters, and to fibrous webs made from these compositions. The present invention is also directed to fiber forming compositions made from aromatic copolyesters blended with aromatic polyesters, and to fibrous webs made from these compositions.

Fibrous webs made from the compositions of the invention can be thermally bonded to other fibrous webs, and/or to each other, at substantially lower temperatures than the aromatic polyesters themselves. The fiber forming capability of base polymers is maintained in the compositions despite the presence of the aliphatic copolyesters or aromatic copolyesters.

The blending of these compositions can be achieved with a twin-screw extruder or a single screw extruder, for example. Furthermore, the compositions can have as little as 5 wt % of aliphatic copolyester or aromatic copolyester for detectable beneficial reduction in bonding temperature.

The compositions of the invention can be in the form of fibers, including nonwoven fibers.

With the foregoing in mind, it is a feature and advantage of the invention to provide compositions having favorable fiber forming properties as well as the ability to be thermally bonded at relatively moderate bonding temperatures.

DEFINITIONS

Within the context of this specification, each term or phrase below will include the following meaning or meanings.

"Aliphatic compounds" are organic compounds characterized by a straight or branched-chain arrangement of the constituent carbon atoms. Aliphatic hydrocarbons include three subgroups. The first subgroup is paraffins (alkanes) which are saturated and comparatively unreactive. The second subgroup is olefins (alkenes or alkadienes), which are unsaturated and quite reactive. The third subgroup is acetylenes (alkynes), which contain a triple bond and are highly reactive.

"Aliphatic copolyesters" are copolymers of aliphatic compounds and polyesters. These include copolymers of aliphatic compounds with aromatic polyesters, as well as copolymers of aliphatic compounds with polyesters that are not aromatic.

"Amorphous copolyethylene ester" is a type of copolyester that lacks a distinct crystalline structure.

"Aromatic compounds" are cyclic hydrocarbons containing one or more rings, typified by benzene, each ring having six carbon atoms and three double bonds.

"Aromatic copolyesters" are copolymers of aromatic compounds and polyesters. These include copolymers of aromatic compounds with aromatic polyesters, as well as copolymers of aromatic compounds with polyesters that are not aromatic.

"Aromatic polyesters" are polyesters containing at least one aromatic molecule or compound. Aromatic polyesters include, for instance, polyethylene terephthalate (PET), polytrimethylene terephthalate (PTT), polybutylene terephthalate (PBT), and their copolymers and the like.

"Polyesters" are a group of synthetic resins that are polycondensation products of dicarboxylic acids with dihydroxy alcohols.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Semicrystalline copolyethylene ester" is a type of copolyester that includes about 40 to 60% crystalline matter and about 40 to 60% amorphous matter.

"Spunbonded fiber" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

These terms may be defined with additional language in the remaining portions of the specification.

DETAILED DESCRIPTION OF THE PRESENTLY PREFERRED EMBODIMENTS

The compositions of the invention include a blend of an aliphatic copolyester and an aromatic polyester. As a result, the compositions can be bonded to fabrics at relatively low temperatures, and can have relatively good fiber forming capabilities. In the case of fibrous webs made from the compositions of the invention, the fibers can also be more easily thermally bonded to each other, for example, in a spunbonding process.

In general, aliphatic copolyesters have lower melting points than aromatic polyesters. In fact, the melting points of aliphatic copolyesters are in the same range as the melting points of polyolefins. However, the fiber forming capabilities of aliphatic copolyesters do not even come close to the excellent fiber forming capabilities of aromatic polyesters. By blending an aliphatic copolyester with an aromatic polyester, the resulting compositions can be bonded at substantially lower temperatures than the aromatic polyester and can maintain the fiber forming capability of the aromatic polyester. Furthermore, beneficial reduction in bonding temperature can be exhibited when as little as 5 wt % of aliphatic copolyester is present in the composition.

Suitable aromatic polyesters for use in this invention include, without limitation, polyethylene terephthalate (PET), polytrimethylene terephthalate (PTT), polybutylene terephthalate (PBT), and combinations thereof. These aromatic polyesters are widely used in fiber forming applications.

Suitable aliphatic copolyesters can be prepared by reacting diols and diacids (or diesters or anhydrides) at temperatures from about 150 degrees Celsius to about 300 degrees Celsius in the presence of polycondensation catalysts such as titanium tetrachloride, manganese diacetate, antimony oxide, dibutyl tin diacetate, zinc chloride, or combinations thereof. The catalysts are typically employed in amounts between 10 to 1000 ppm, based on total weight of the reactants. The final stages of the reaction are generally conducted under high vacuum (<10 mm Hg) in order to produce a high molecular weight polyester.

Suitable aliphatic copolyesters can also be prepared using (as the aliphatic component) aliphatic polyhydric alcohol, aliphatic polycarboxylic acid and hydroxycarboxylic acid. Examples of aliphatic polyhydric alcohols that can be used include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol, 1,4-benzenedimethanol, trimethylolpropane, trimethylolethane, trimethylolheptane, 1,2,4-butanetriol and 1,2,6-hexanetriol, and combinations thereof. Examples of aliphatic polycarboxylic acids that can be used include oxalic acid, malonic acid, succinic acid, glutaric acid, adipic acid, pimelic acid, suberic acid, azelaic acid, sebacic acid, undecanoic diacid, dodecanoic diacid and tricarballylic acid, and combinations thereof.

A specific example of a suitable aliphatic copolyester is available under the trade name BOSTIK® 4178, available from Bostik of Middleton, Mass. The blends of aliphatic copolyester and aromatic polyester can be readily formed into fibrous nonwoven webs.

Alternatively, in another embodiment of the invention, aromatic copolyester can be used in place of the aliphatic copolyester in a nonwoven fabric. Instead of forming a nonwoven web from a polymer blend of an aliphatic copolyester and an aromatic polyester, the nonwoven web can contain an aromatic copolyester blended with an aromatic polyester. Although they may have an aromatic structure, copolyesters, such as copolyethylene terephthalate, melt at lower temperatures than typical aromatic polyester fibers, such as polyethylene terephthalate, and provide adequate bonding both to the aromatic polyester fibers and to a web. Examples of suitable aromatic copolyesters include amorphous copolyethylene esters such as EASTAR® polyethylene terephthalate glycol (PETG), available from Eastman Chemical Company of Kingsport, Tenn., and semicrystalline copolyethylene esters such as Copolyester 21398, also available from Eastman Chemical Company.

In any case, the copolyester in the compositions of the invention, whether an aliphatic copolyester or an aromatic copolyester, has a lower melting point than the aromatic polyester in the compositions. Suitably, the melting point of the copolyester is about 100 to 175 degrees Fahrenheit lower than the melting point of the aromatic polyester. For example, the melting point of the copolyester can be about 110 to 170 degrees Fahrenheit lower than the melting point of the aromatic polyester. As another example, the melting point of the copolyester can be about 115 to 165 degrees Fahrenheit lower than the melting point of the aromatic polyester.

The compositions of the invention can be formed into fibers including sheath/core or side-by-side bicomponent fibers, as well as monocomponent fibers. The fibers may be nonwoven fibers, such as spunbond fibers, meltblown fibers, air-laid fibers, and staple fibers. The resulting fibers can be used to make multi-fiber yarn and woven fabrics, as well as nonwoven webs.

The compositions of the invention can have as little as 5 wt % of the copolyester for detectable beneficial reduction in bonding temperature. The composition suitably includes between about 5 and about 50 wt % of the copolyester polymer. The composition also includes between about 50 and about 95 wt % of the aromatic polyester polymer. For example, the composition can include between about 10 and about 40 wt % of the copolyester and between about 60 and 90 wt % of the aromatic polyester. As another example, the composition can include between about 15 and about 30 wt % of the copolyester and between about 70 and 85 wt % of the aromatic polyester.

The polymer blend compositions can be made in a variety of ways including, for example, using a twin-screw extruder or a single screw extruder. The polymer blend compositions are then formed into fibrous webs using conventional fiber-spinning techniques. Any type of fiber including the polymer blend composition of the invention suitably has a blend of the copolyester and the aromatic polyester at least on an outer surface of the fibers.

In one embodiment, the polymer blend composition is used as the sheath component for sheath/core bicomponent fibers. A sheath/core fiber including the composition of the invention suitably includes between about 50 and 95 wt % of the aromatic polyester and between about 5 and 50 wt % of the copolyester in the sheath. For example, the sheath/core fiber can include between about 60 and 95 wt % of the aromatic polyester and between about 5 and 40 wt % of the copolyester in the sheath. As another example, the sheath/core fiber can include between about 70 and 95 wt % of the aromatic polyester and between about 5 and 30 wt % of the copolyester in the sheath. The core of the sheath/core fiber can be made of any suitable polymer. For example, the core can include a thermoplastic polymer selected from polyamides, polyesters, and/or polyolefins (e.g. polyethylene, polypropylene, polybutene, ethylene copolymers, propylene copolymers, or butene copolymers). Each of the sheath and core should constitute about 10 to 90 wt % of the fiber, or about 20 to 80 wt %, or about 30 to 70 wt %.

As mentioned, the composition can be in the form of side-by-side bicomponent fibers, each fiber having a first side composed of a blend of the copolymer and the aromatic polyester and a second side composed of any suitable polymer. For example, the second side of each fiber can include a thermoplastic polymer selected from polyamides, polyesters, and/or polyolefins (e.g. polyethylene, polypropylene, polybutene, ethylene copolymers, propylene copolymers, or butene copolymers). When the composition is in the form of side-by-side bicomponent fibers, the overall weight percentages of the aromatic polyester and the copolyester in the fibers should be the same as if the composition were in the form of a polymer blend.

Conventional bicomponent spinning processes can be used for making the composition of the invention in the form of sheath/core or side-by-side bicomponent fibers. For example, PET-1N211 (0.55 intrinsic viscosity), available from NanYa in Lake City, S.C., is a suitable aromatic polyester that can be used to form the core of a sheath/core fiber or one side of a side-by-side fiber. Bicomponent fibers can be produced by bicomponent spunbonding processes which are well known in the art. These processes generally use an extruder to supply the molten polymers to a spinnerette where the polymers are fiberized in a sheath/core or side-by-side arrangement. The fibers can then be drawn, usually pneumatically, and deposited on a foraminous mat or belt to form a nonwoven fabric, for example. Fibers produced in the spunbond process are generally in the range of from about 1 to about 50 microns in diameter, depending on process conditions and the desired end use for the fabrics to be produced from such fibers.

The copolyester can be combined with the aromatic polyester to form, for example, a 30% blended sheath of copolyester and polyester/70% PET core, or a 20% blended sheath/80% PET core, or a 40% blended sheath/60% PET core. In terms of a semicrystalline copolyester versus an amorphous copolyester, the semicrystalline copolyester appears to perform better in terms of experiencing less on-line shrinkage and the resulting material being stronger, softer and bonded more evenly than when an amorphous copolyester is used.

Once a dimensionally stable fibrous web is made using the composition of the invention, its thermal bonding temperature to a fibrous web can be determined and optimized. When bonding the layers, the set bonding temperature and the actual bonding temperature of both a top calender roll and a bottom calender roll through which the layers are bonded can be recorded using a thermocouple.

With an aliphatic copolyester and PET blend (having a lower melting temperature) on the sheath and polypropylene in the core of bicomponent fibers, a dimensionally stable web can be formed by bonding the fibers to each other well below the polyester's melting temperature. An example of the inter-fiber bonding temperature of one composition of the invention compared to the bonding temperature of a 100% polypropylene sample is described below.

EXAMPLE

In a spunbond trial, a first composition including 30% blend of copolyester and polyethylene terephthalate (PET) and 70% polypropylene (PP) was spun in a sheath/core configuration, with a 95% PET and 5% BOSTIK® 4178 copolyester blend on the sheath and the PP in the core. A second composition included 100% PP monofilament as a control. Each of the two fabrics was bonded at a bond roll temperature of 277° Fahrenheit (136° Celsius). The bonding temperature was 250° Fahrenheit (121° Celsius). When 100% PET was used as the sheath the fabrics could not be bonded in any meaningful sense at temperatures under 390° Fahrenheit (199° Celsius).

TABLE 1

Comparison of Material Properties Based on Fabric Composition

| Composition | Bonding Temp. (° F.) | Basis Weight (osy) | MD Tensile (lbs.) | MD Strain (%) | MD Energy (In-lb) | CD Tensile (lb) | CD Strain (%) | CD Energy (In-lb) |
|---|---|---|---|---|---|---|---|---|
| 30% Blend 70% PP | 250 | 1.24 | 9.4 | 36.8 | 6.9 | 9.8 | 53.2 | 9.34 |
| 100% PP | 277 | 1.27 | 22.2 | 62.2 | 26.11 | 21.7 | 63.0 | 25.6 |

As can be seen in Table 1, the PET/PP composition had inferior material properties compared to the PP composition, but was at least able to bond at a moderate bonding temperature. The inclusion of the copolyester as a bonding agent demonstrates that a PET web can be bonded on systems primarily designed to process olefin based materials.

The compositions of the invention can be incorporated into disposable absorbent articles. Examples of such suitable articles include diapers, training pants, feminine hygiene products, incontinence products, other personal care or health care garments, including medical garments, or the like. Furthermore, the compositions of the invention can also be used for printing or medical applications.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

We claim:

1. A fiber comprising a blend of an aliphatic copolyester and an aromatic polyester on an outer surface of the fiber, wherein the aliphatic copolyester has a lower melting point than the aromatic polyester;

the fiber having a first component and a second component in a side-by-side arrangement, wherein the first component includes the aliphatic copolyester and the aromatic polyester and the second component includes a polymer.

* * * * *